United States Patent [19]
Fujie et al.

[11] Patent Number: 5,166,825
[45] Date of Patent: Nov. 24, 1992

[54] POWER SUPPLY DEVICE FOR ULTRASONIC VIBRATOR AND VEHICLE MIRROR

[75] Inventors: Naofumi Fujie, Nagoya; Tomoaki Imaizumi, Hoi; Koji Ito, Kariya; Taneichi Kawai, Anjo, all of Japan

[73] Assignee: Aisin Seiki Kabushiki Kaisha, Kariya, Japan

[21] Appl. No.: 582,369

[22] Filed: Sep. 14, 1990

[30] Foreign Application Priority Data

Sep. 16, 1989 [JP] Japan .................. 1-240421
Sep. 28, 1989 [JP] Japan .................. 1-252560
Nov. 14, 1989 [JP] Japan .................. 1-295614

[51] Int. Cl.$^5$ .................. G03B 11/04; H01L 41/08
[52] U.S. Cl. .................. 359/509; 359/507; 310/365
[58] Field of Search ........... 350/582, 584, 588, 632, 350/358; 307/150; 359/507-509, 510-511; 15/250 B, 250 R; 134/1, 16-17; 310/311-319, 363-370

[56] References Cited

U.S. PATENT DOCUMENTS

| | | | |
|---|---|---|---|
| 4,701,659 | 10/1987 | Fujii et al. ............ | 310/366 |
| 4,833,373 | 5/1989 | Doi et al. ............. | 350/582 |
| 4,920,296 | 4/1990 | Takahashi et al. ....... | 310/370 |
| 4,929,072 | 5/1990 | Fujie et al. ........... | 350/582 |
| 5,007,722 | 4/1991 | Hori et al. ............ | 350/582 |
| 5,025,187 | 6/1991 | Fujii et al. ........... | 310/369 |

FOREIGN PATENT DOCUMENTS

| | | | |
|---|---|---|---|
| 150201 | 7/1987 | Japan ................ | 350/582 |
| 306347 | 12/1989 | Japan ................ | 350/582 |
| 1079732 | 8/1967 | United Kingdom ....... | 350/582 |

*Primary Examiner*—Rodney B. Bovernick
*Assistant Examiner*—Thong Nguyen
*Attorney, Agent, or Firm*—Burns, Doane, Swecker & Mathis

[57] ABSTRACT

A power supply device adapted to supply power to a pair of electrodes formed on opposite end surfaces of an ultrasonic vibrator. The device has a circuit layer arranged on a flexible base. The circuit layer has a pair of supply electrodes arranged at its one longitudinal end and a pair of end connections arranged at the other longitudinal end. A pair of conductive layers electrically connect the supply electrodes and the end connections, respectively. Each supply electrode has an inner surface of substantially the same shape as the end surface of the ultrasonic vibrator, the inner surface being joined electrically and mechanically with the electrode of the ultrasonic vibrator. The flexible base has an electrode base covering an entire outer surface of each of the supply electrodes, and a circuit base holding the conductive layers. A shield layer may be disposed on the flexible base in order to screen electromagnetic radiation from the circuit layer.

15 Claims, 13 Drawing Sheets

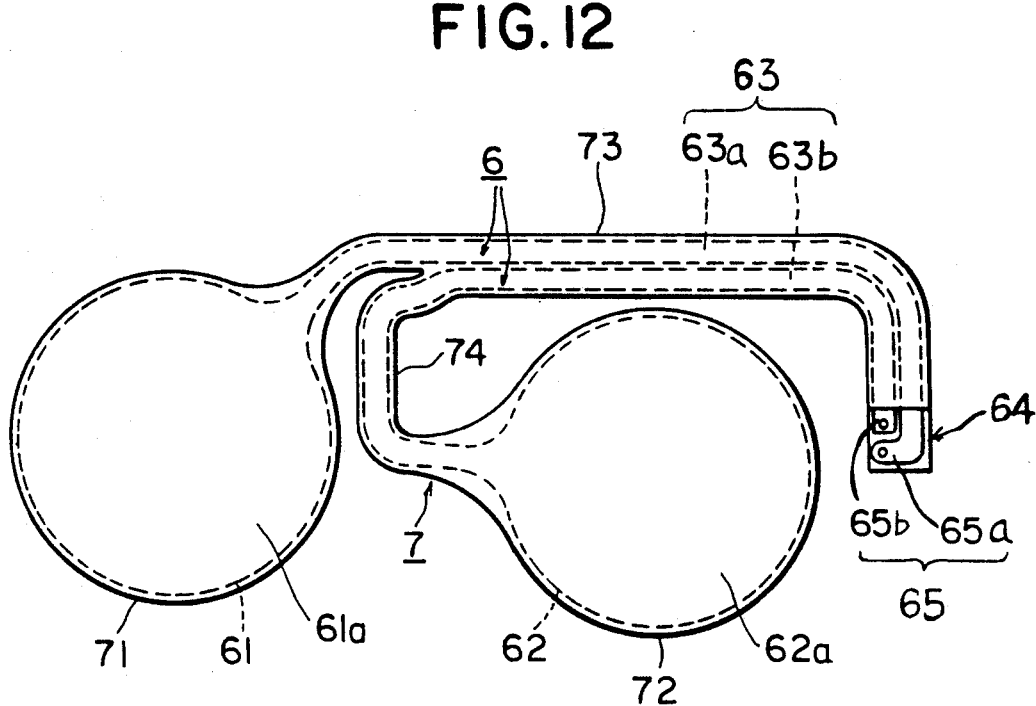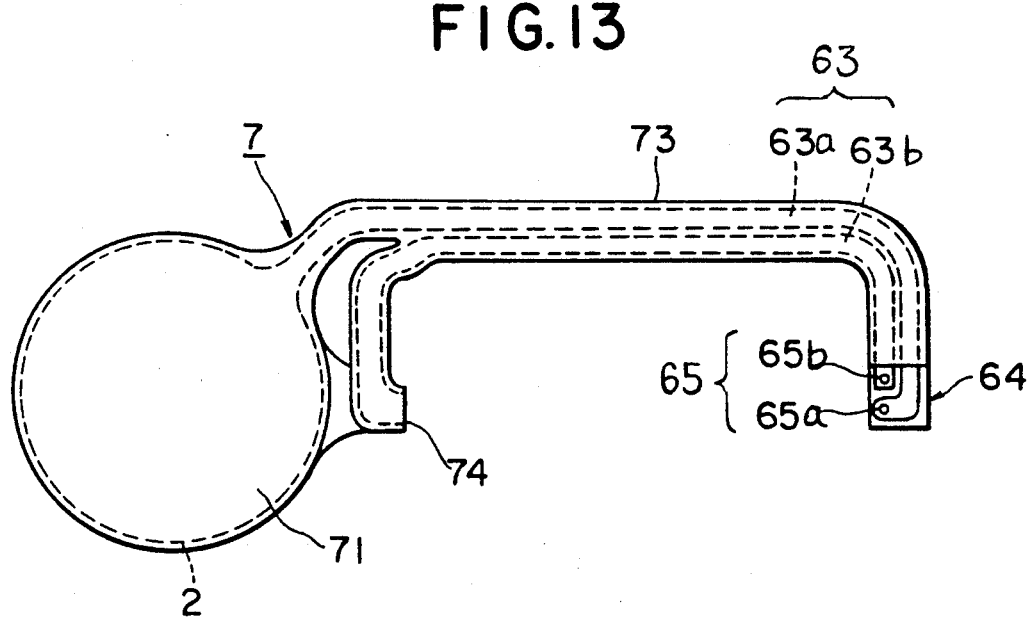

POWER SUPPLY DEVICE FOR ULTRASONIC VIBRATOR AND VEHICLE MIRROR

BACKGROUND OF THE INVENTION

1. Field of the Invention

This invention relates generally to power supply devices adapted to supply power to ultrasonic vibrators and vehicle mirrors. More particularly, it relates to power supply devices for ultrasonic vibrators which are used in vehicle outside rear view mirrors to clear water drops, ice grains, frosted or condensated moistures, etc. on mirror surfaces, and vehicle mirrors using the ultrasonic vibrators as well as power supply devices.

2. Description of the Related Art

Japanese Laid Open Utility Model Publication No. 61-30552, that has been laid open to public inspection on Feb. 24, 1986, describes a vehicle mirror. FIG. 14 in the present application shows a cross section of a cleaning device for a car mirror disclosed in the aforementioned Japanese Publication No. 61-30552.

As seen in FIG. 14, a rear view mirror is arranged outside a vehicle body. A holder 92 has a glass mirror 91 fitted thereto. The holder 92 is fixed by a stay 93 to a car body. An ultrasonic vibrator 94, made of ceramics for example, is arranged between the holder 92 and the stay 93. An operation switch 95 is disposed in the cabin of the vehicle and is connected with the vibrator 94 so that the vibrator can be operated from the cabin. A drive circuit 96 and a power source 97 are connected in series to the ultrasonic vibrator 94 and the operation switch 95.

The drive circuit 96 amplifies signals, generated by an oscillator, through an amplifier and sends amplified signals to the vibrator 94 to make it vibrate accordingly.

The vehicle mirror with this ultrasonic vibrator 94 operates as follows.

When water drops are deposited on a mirror surface, the operation switch 95 is switched on to work the vibrator 94. Then, the vibrator 94 oscillates the entire holder 92 and removes the water drops on the mirror surface.

To effect such operation, it is necessary to supply power of an ultrasonic oscillation frequency to the vibrator 94 through lead wires and the like. However, vibration is also transmitted and this can apply some stress to the lead wires, thereby possibly causing breakage of the lead wires at the places where the wires are joined to the vibrator 94. Therefore, durability of the lead wires is a matter of concern in the conventional vehicle mirror.

Japanese Laid Open Utility Model Publication No. 59-40145, which has been laid open to public inspection on 1984, shows another vehicle mirror. FIG. 15 is a perspective view of a rear surface of the vehicle mirror arranged outside a car body.

As seen in FIG. 15, a planar heater 102 is fitted to the rear surface of a mirror 101. The heater 102 is supplied with power through terminals 103 and 104 to heat a front surface of the mirror 101. The water drops on the mirror surface are cleared off as the front surface of the mirror 101 is heated, so that a clear view through the mirror is possible.

The combination of the heater 102 and an ultrasonic vibrator may be available to assure a clear view through a mirror. In this case, the strength of the lead wires at the terminals 103 and 104 is also a matter of concern, since they suffer from stress by the vibrator.

The inventors of the present application have found that a flexible material such as flexible cable absorbed by itself the stress and was fatigued when used for supplying power to a vibrator. This material prevents breakage of a circuit and contributes much to prolongation of the life of the circuit.

However, the flexible material is so expensive that, it will increase the price of the mirror. Moreover, there will be trouble if the flexible material is damaged by scratches in assembling work. Therefore, much care is necessary to handle the flexible material in the assembling work, thereby making it difficult to improve the work efficiency.

SUMMARY OF THE INVENTION

An object of this invention is to provide a power supply device for an ultrasonic vibrator that can stably supply power to the vibrator while preventing stress on the vibrator from accumulating at fixed locations so that breakage of a power supply circuit be avoided.

A further object of this invention is to provide a vehicle mirror that makes it possible to improve efficiency in assembling work.

A still further object of this invention is to provide a vehicle mirror that can efficiently transmit ultrasonic vibration to a mirror.

In order to acheive the foregoing objects, in accordance with a first aspect of this invention, a power supply device is adapted to supply power to a pair of electrodes formed on opposite end surfaces of an ultrasonic vibrator. The device has a circuit layer. A pair of supply electrodes are arranged at one longitudinal end of the circuit layer. Each supply electrode has an inner surface of substantially the same shape as the end surface of the ultrasonic vibrator. The supply electrode has an inner surface disposed on the electrode of the ultrasonic vibrator. A pair of end connections are arranged at the other longitudinal end of the circuit layer. A pair of conductive layers electrically connect the supply electrodes and the end connections, respectively. The device also has a flexible base. The flexible base has an electrode base covering the entire outer surface of each of the supply electrodes. The flexible base also has a circuit base holding the conductive layer.

In accordance with a second aspect of the present invention, a vehicle mirror has a mirror with a convex curved surface. A support is arranged at a rear surface of the mirror. The support has a connecting circumference of such a curved shape as to be two-dimensionally touched with the rear surface of the mirror. An ultrasonic vibrator is connected to the support. The power supply device of the first aspect is adapted to supply power to the ultrasonic vibrator. A holder having a connecting portion joins the mirror and the support while providing electrical connection to the power supply device.

Other aspects, objects, and the several advantages associated with the invention will become apparent to one skilled in the art from a reading of the following disclosure and the appended claims.

BRIEF DESCRIPTION OF THE ACCOMPANYING DRAWINGS

FIG. 12 is a developed view of another modification of a power supply device.

FIG. 13 is a top plan view of the power supply device.

DETAILED DESCRIPTION OF THE PREFERRED EMBODIMENTS

A preferred embodiment of this invention will be discussed with reference to an outside rear view mirror for cars and will be described hereafter with reference to the accompanying drawings.

As shown in FIGS. 1 to 5, a holder 1 of the mirror is formed of synthetic resin by means of injection molding. The holder 1 is composed of a casing or retainer 13 of substantially a square plan shape. The retainer 13 has an opening 12 at one thickness end thereof. A mirror 4 is supported within the retainer 13 so that light which strikes the mirror 4 is reflected therefrom. The mirror 4 has a convex surface of a predetermined curvature. The holder 1 is held by a stay or the like (not shown) and is fixed to a car body.

As is well known, the mirror 4 is made of a transparent body that faces and is exposed from the opening 12 of the holder 1, and a reflecting layer of metal film that is formed on a rear surface of the transparent body by vapor deposition or the like.

Figure 3:
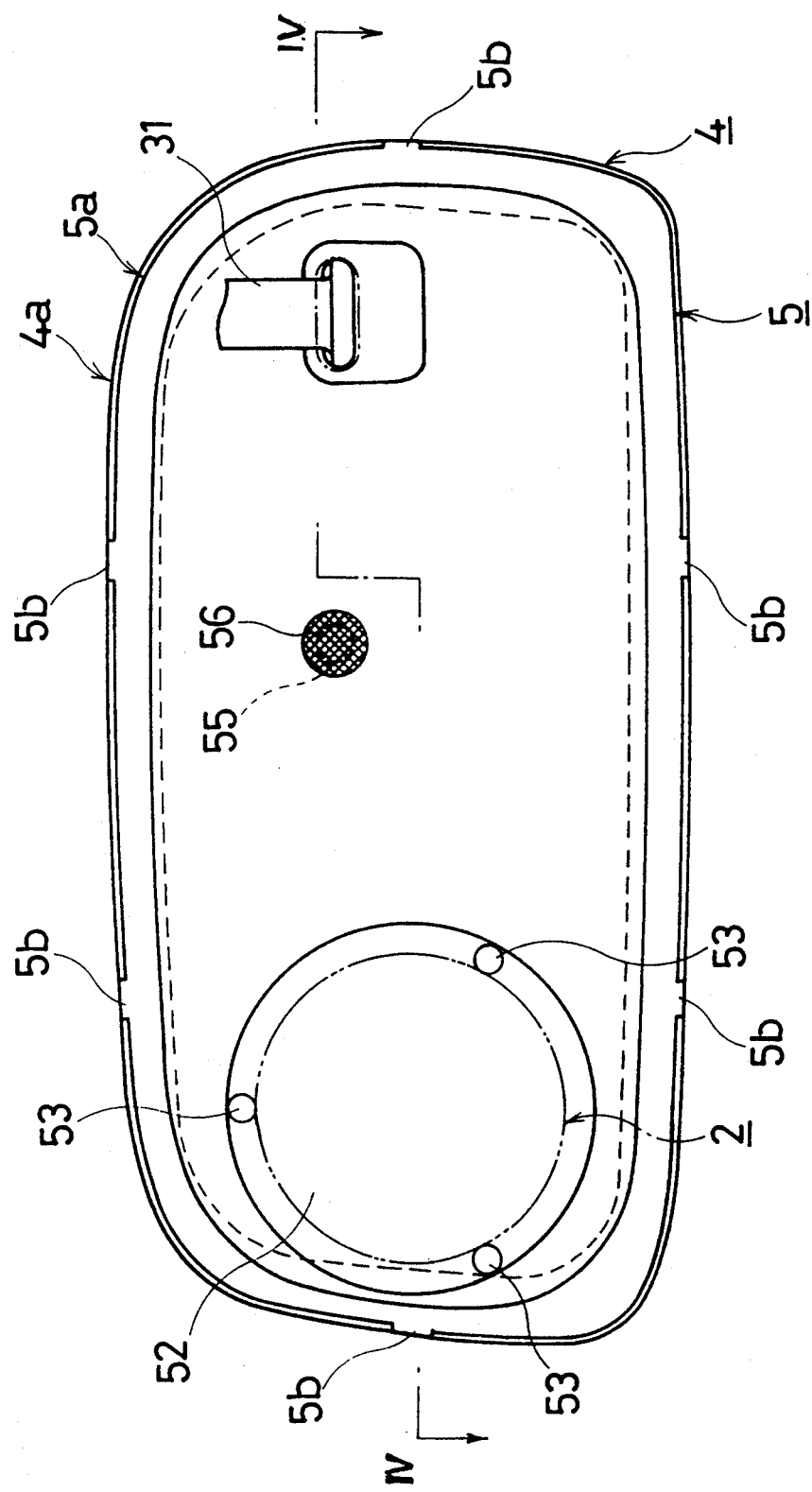
FIG. 3 is a rear view of an assembly of the mirror, support and heater plate.
Figure 4:
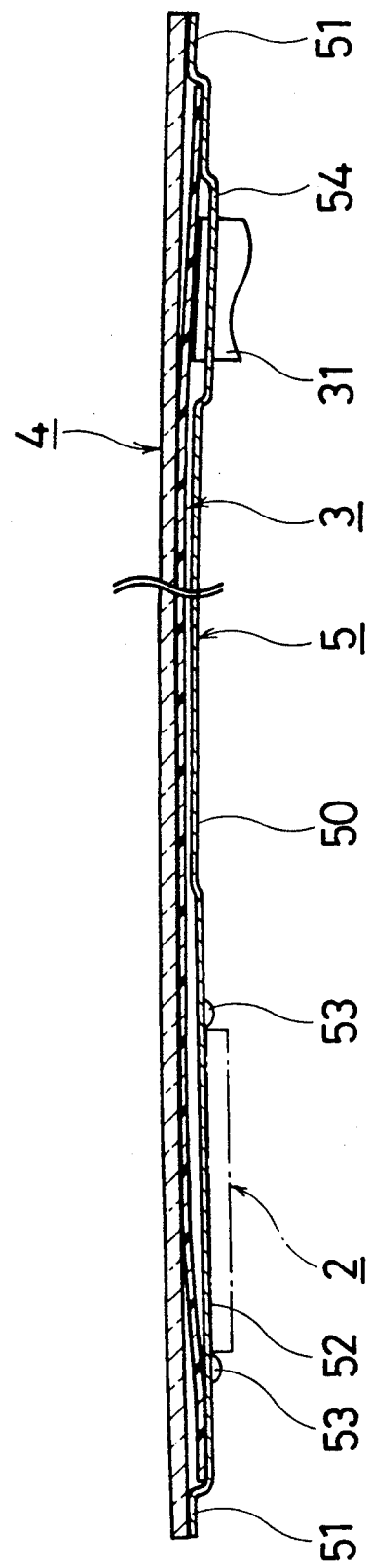
FIG. 4 is a cross sectional view taken along the line IV—IV of FIG. 3 for showing the mirror, support and heater plate.
Figure 5:
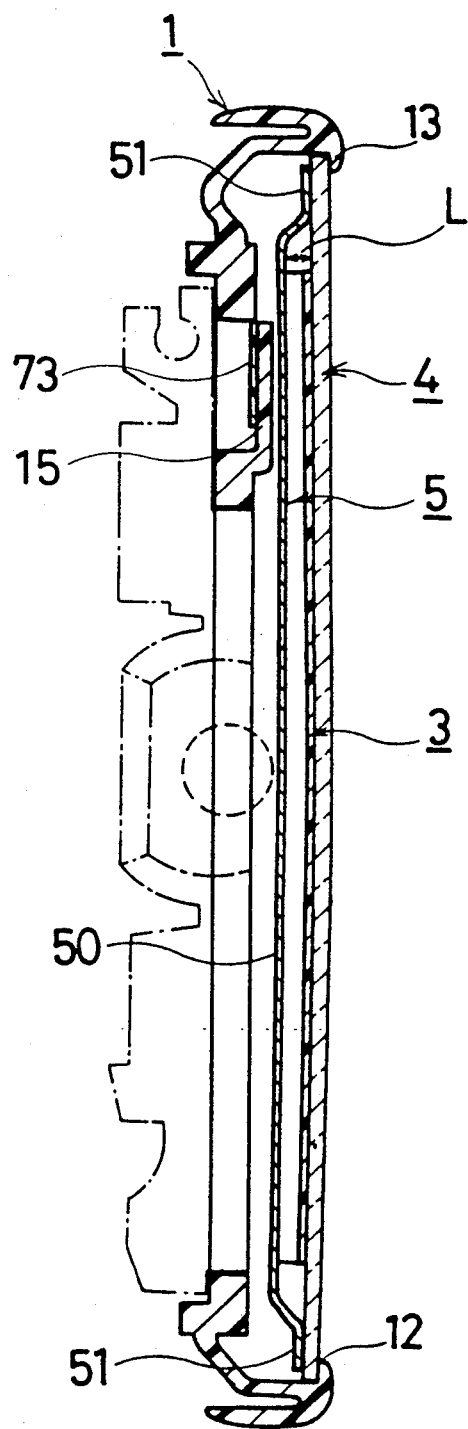
FIG. 5 is a longitudinal cross-sectional view taken along the line V—V of FIG. 1 for showing the mirror, support and heater plate accommodated and assembled in the holder.

As illustrated in FIGS. 3 to 5, a support 5 is arranged on the rear side of the mirror 4. The support 5 is made of a metallic plate having substantially the same dimension as the mirror 4 and or similar coefficient of thermal expansion of the mirror 4. Available metals are, for example, a ferrite stainless, martensite stainless or the like.

The support 5 has a body 50 and a joining flange or connecting circumference 51. The body 50 has substantially the same curvature as the curvature of the rear surface of the mirror 4. The body 50 is disposed in facing relation to the rear surface of the mirror 4 with a fixed space L therebetween. The joining flange 51 is two-dimensionally touched with the rear surface of the mirror 4.

More specifically, the body 50 has a fitting area 52 of flat surface on which an ultrasonic vibrator 2 is attached. Regulating means, preferably in the form of a plurality of regulating projections 53, are provided around the fitting area 52 in order to regulate the position of the vibrator 2 on the area 52. The support 5 further has an insertion block 54 with a slot to introduce a flexible printed board or cable 31 therethrough.

The distance L between the body 50 and the mirror 4 is made generally uniform so as to define a space of a small and even thickness between the body 50 and the mirror 4. In adhering the flange 51 to the mirror 4, adhesive is uniformly spread over the entire margin of the mirror 4 so as to get close adhesion between the flange 51 and the mirror 4 as well as to prevent distortion of the mirror 4 resulting from the mirror 4 being joined to the body 50.

The fitting area 52 is formed, preferably at the time of molding the support 5, to have substantially the same flat surface as a surface of the vibrator 2 that is to be joined to the fitting area 52. The regulating projections 53 are formed, preferably also when making the support 5, in a convex shape on or around the flat surface of the fitting area 52. Adhesive is applied in a small and even thickness, when fitting the vibrator 2 to the fitting area 52, for the purpose of improving the transmission efficiency of ultrasonic vibration. The regulating projections 53 facilitate correct positioning of the vibrator 2 on the area 52.

The flexible cable 31 supplies power to planar heating means, preferably a heater plate 3.

The flexible cable 31 is introduced through the insertion block 54 into the support 5. Then, the block 54 is sealed by a sealant while the cable 31 is kept in a relaxed state between the support 5 and the heater plate 3. The support 5 has a portion that is indented to be away from the mirror 4 to thereby define a larger space or recess. Connected the connected part of the flexible cable 31 and the heater plate 3 is accommodated in the recess. The recess prevents the connected part from contacting the support 5.

The support 5 has such a dimension that a circumference 5a thereof can be placed inside the circumference 4a of the mirror 4 with one or two millimeters clearance. Thus, excessive adhesive, if any, is restrained from being exposed to the front side of the mirror 4 in adhering the flange 51 thereto. A space between the circumferences 4a and 5a is determined according to the type of adhesive and the shape of the retainer 13. However, it is desirable to make the space as small as possible in consideration of the transmission efficiency of the oscillation by the vibrator 2. Positioning protrusions 5b, six in this embodiment, are formed on the circumference 5a of the support so as to reach the circumference 4a of the mirror 4. The outermost edges of the protrusions 5b are aligned with the circumference 4a in adhering the flange 51 to the mirror 4. Thus, the positioning of the mirror 4 and the support 5 is easily carried out.

When the flange 51 is connected to the mirror 4, the body 50 is displaced by the distance L from the flange 51 to define a step therebetween. This step is formed just inside an inner circumference of the flange 51, after an area of the flange 51 is determined. The area of the flange 51 is selected in such a range as to assure the required strength for adhering the flange 51 to the mirror 4. The step is smoothly curved to close and define the margin of the flange 51. As shown in FIG. 3, the body 50 has curvatures at its corners that are larger than the corresponding curvatures of the corners of the mirror 4. The curvature of the circumference of the body 50 as a whole is larger than the curvature of the outline or circumference of the mirror 4. Thereby, no reflection is produced by the ultrasonic oscillation of the vibrator 2 on the body 50.

The positioning protrusions 5b are pressed by flexible pieces 11 of the holder 1 so that the mirror 4 and the support 5 are held between the protrusions 5b and the retainer 13. Thus, the mirror 4 and the support 5 are attached to the holder 1.

The support 5 is joined to the entire margin of the mirror 4 via the flange 51 while the flexible printed cable 31 is sealed at the insertion block 54. This means that the heater plate 3 is accomodated in a closed space surrounded by the support 5 and the mirror 4. In consideration thereof, preferably, a vent 55 is formed on the body 50 in the present embodiment. Breather means is disposed on the vent 55. The breather means may be preferably a fiber sheet 56 like GORETEX that permits vapor to pass but prevents water drops from going therethrough. The fiber sheet 56 is fitted to the vent 55 via adhesive. Accordingly, water drops in the closed space, if any, can be vaporized and exhausted out of the space.

Figure 6:
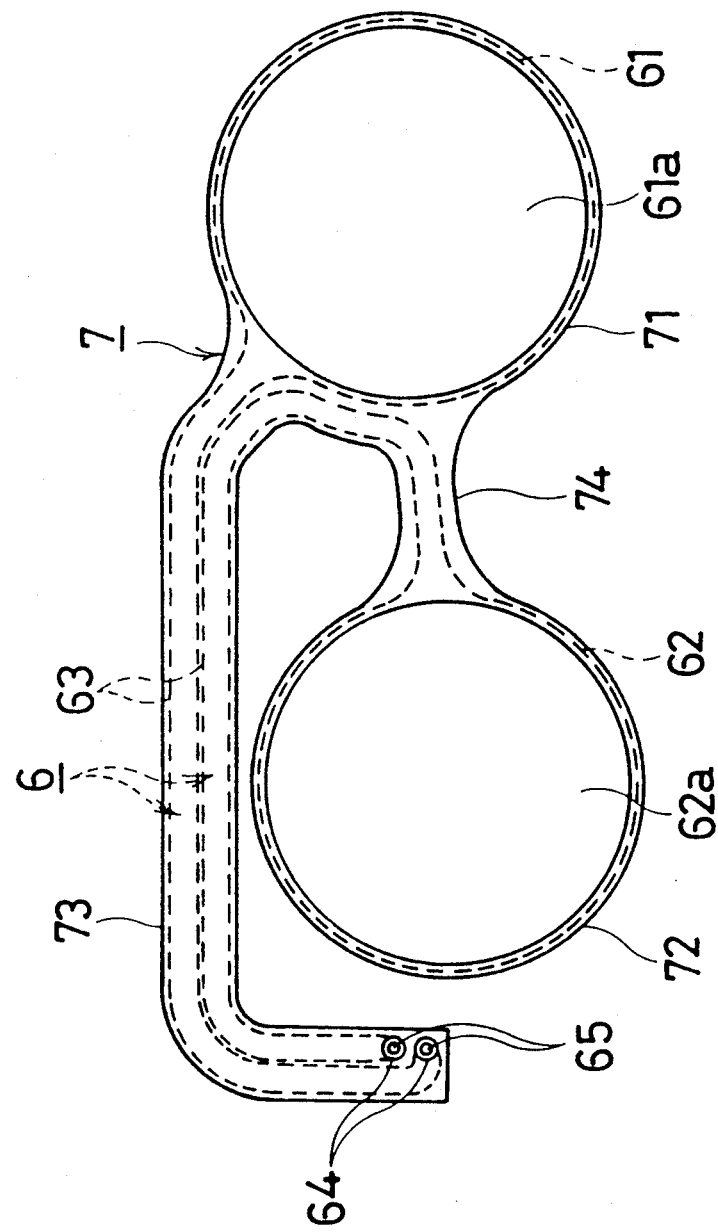
FIG. 6 is a developed view of a power supply device for an ultrasonic vibrator used in the embodiment of this invention.
Figure 8:
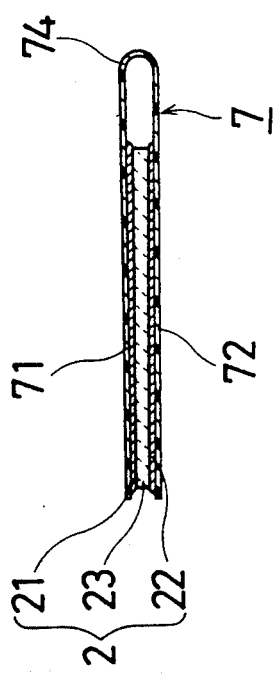
FIG. 8 is a cross sectional view taken along the line VIII—VIII of FIG. 7.
Figure 7:
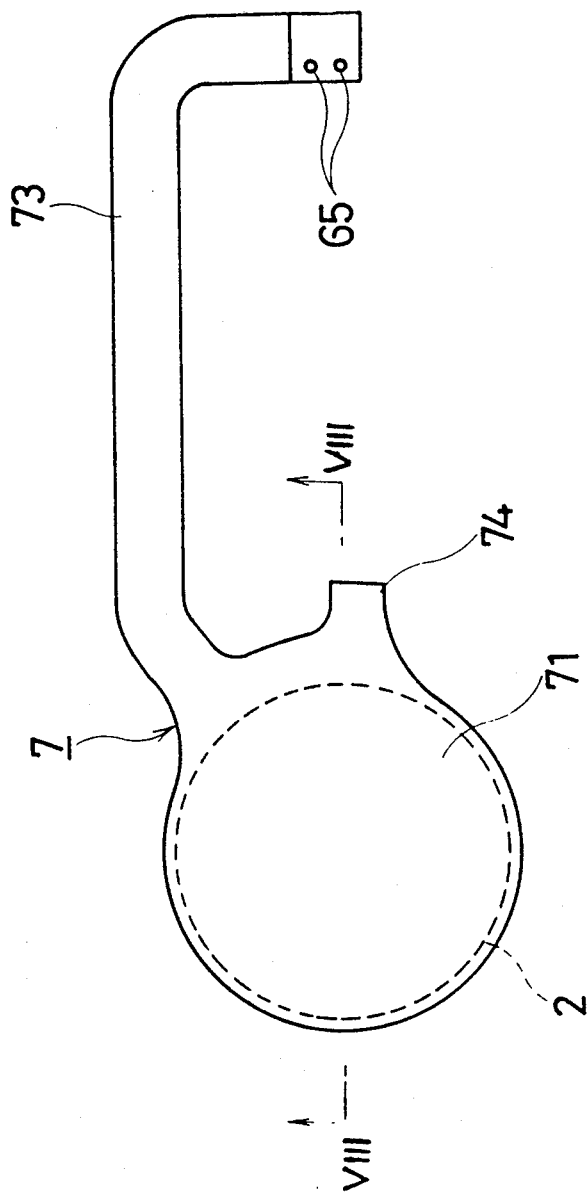
FIG. 7 is a top plan view of the power supply device.

FIGS. 6 to 8 illustrate a flexible base 7. The flexible base 7 is made of a well known insulating film with flexibility. Such films may be selected, for example, from polyester film, polyimide film or the like. The flexible base 7 has electrode bases 71 and 72 as electrode forming portions. Two supply electrodes 61 and 62 as electrode portions are formed on the electrode bases 71 and 72, respectively. Each supply electrode 61, 62 is connected electrically and mechanically to an electrode 21, 22 formed on opposite end surfaces of a piezoelectric element 23 that constitutes the ultrasonic vibrator 2. A connection base 74 as a connection forming portion is formed integrally and continuously between the electrode bases 71 and 72. The connection base 74 is adapted to be bent when the supply electrodes 61 and 62 are connected with the end surfaces of the ultrasonic vibrator 2. The electrode bases 71 and 72 and the connection base 74 define a spectacle shape in plan view as a whole. The flexible base 7 further has a circuit base 73 as a circuit forming portion. The circuit base 73 has its one longitudinal end integrally joined with the electrode base 71 and the other longitudinal end provided with end connections 64. The end connection 64 has a connection hole 65.

A conductive layer 63 as a circuit portion is formed of conductive material on the circuit base 73. This conductive layer 63 extends between and electrically connects the supply electrode 61 and one end connection 64. Another conductive layer 63 as another circuit portion is disposed on the circuit base 73, on part of the electrode base 71 near the circumference of the supply electrode 61, and on the connection base 74. This conductive layer 63 extends between and electrically connects the supply electrode 62 and the other end connection 64.

The electrode base 71, 72 veils the entire surface of one end surface of the supply electrode 61, 62, but covers only the circumferential part thereof at the other end surface. Thus, connector areas 61a and 62b are exposed from the electrode bases 71, 72. Each connector area 61a, 62a has substantially the same dimension as the electrode 21, 22 of the vibrator 2. The bases 71, 72 and 73 veil the whole of the conductive layers 63.

The supply electrodes 61 and 62 and the conductive layer 63 constitute a circuit layer 6 as a circuit pattern. The circuit layer 6 is formed on an upper surface of the flexible base 7 by means of printing, sputtering, vapor deposition, or other techniques. The circuit base 73 and the conductive layer 63 constitute a flexible printed cable of the present embodiment. The flexible base 7 and the circuit layer 6 constitute a power supply device.

As shown in FIG. 7, the power supply device has the connection base 74 curved in substantially a U-shape so that the electrodes 61 and 62 face one another. Then, the entire surface of the connector area 61a, 62a of the electrodes 61, 62 is electrically and mechanically connected with the electrode 21, 22 of the vibrator 2. Thus, the electrode bases 71 and 72 are placed on and integrally joined to the opposite ends of the vibrator 2. Accordingly, the flexible base 7 is exposed to the outer surface of the vibrator 2.

Figure 1:
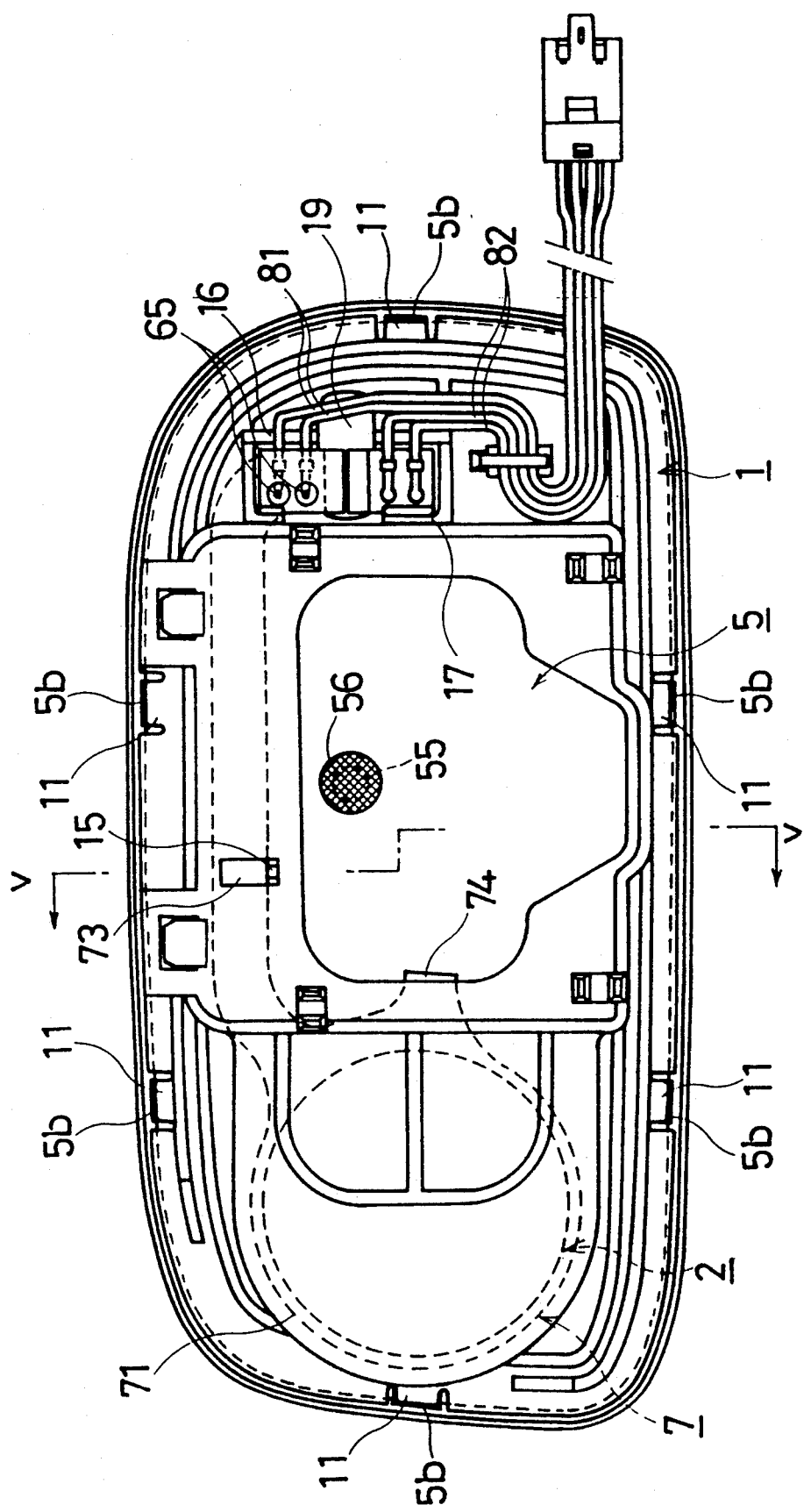
FIG. 1 is a rear view of a vehicle outside rear view mirror of a preferred embodiment of this invention in which a holder incorporates therein a mirror, a support and a planar heater plate.
Figure 2:
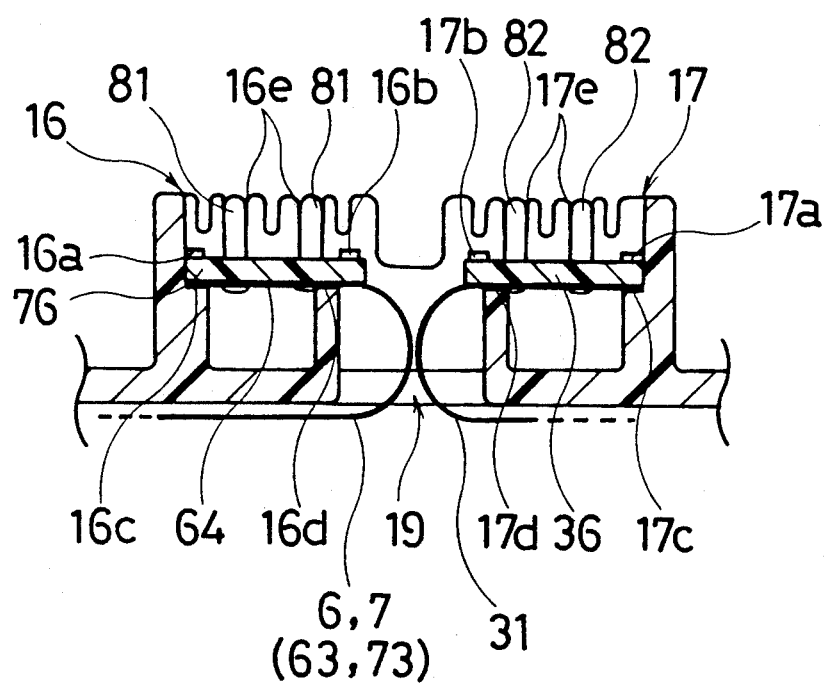
FIG. 2 is a fragmentary cross sectional view of connectors of the holder.

The power supply device usually has the connection holes 65 of the end connections 64 connected with exterior connectors or lead wires by brazing or the like. As shown in FIG. 2, a rigid auxiliary piece 76 is disposed on the end connection 64. The auxiliary piece 76 is two-dimensionally contacted with the flexible base 7 in order to reinforce and ease the attachment of the flexible base 7. In this embodiment, lead wires 81 are connected with the end connections 64 via the connection holes 65 and the auxiliary piece 76.

Figure 9:
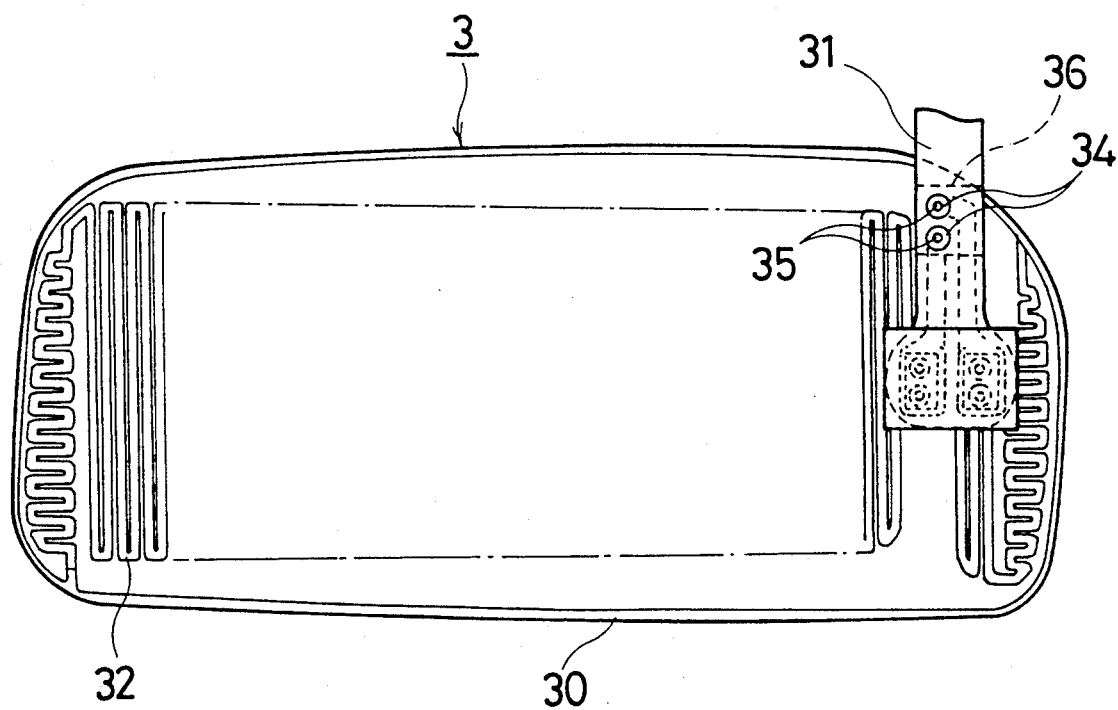
FIG. 9 is a rear view of the heater plate.

As shown in FIG. 9, the heater plate 3 has a flexible substrate 30 made of insulating material. A resistor 32 is layered in a pattern on the flexible substrate 30 by means of printing, vapor deposition, sputtering or the like so as to define a heating portion. Another flexible substrate 30, of insulating material like the above one, covers and holds the resistor 32 therebetween. The flexible printed cable 31 is connected with the resistor 32 to supply power thereto. The flexible printed cable 31 has end connections 34 and connection holes 35 provided on the centers of the end connections 34. The end connections 34 are connected with exterior connectors or lead wires, via the connection holes 35, by means of brazing or the like. A rigid auxiliary piece 36 is disposed on the end connection 34. The auxiliary piece 36 is two-dimensionally contacted with an insulating layer of the flexible printed cable 31 in order to reinforce and ease the attachment of the cable 31. In this embodiment, lead wires 82 are connected with the end connections 34 via the connection holes 35 and the auxiliary piece 36.

The resistor pattern 32 used in the present embodiment is called a PTC (positive temperature coefficient thermistor) heater. The PTC heater has a positive temperature coefficient, namely, it increases its resistivity until it reaches a predetermined Curie temperature. Accordingly, when the PTC heater is applied with voltage to heat by itself, current increases in response to a decrease in temperature so that the heater is maintained at a constant temperature. Thus, it is possible to keep constant the temperature of the resistor pattern 32 or of the space between the mirror 4 and the support 5.

The heater plate 3 of this embodiment is rich in flexibility since it is made of the flexible substrate 30 and the resistor 32 arranged thereon. Moreover, the heater plate 3 is disposed in a relaxed state in relation to the support 5. Thus, the heater plate 3 does not damp the ultrasonic vibration applied via the support 5. Furthermore, applied vibration does not fatigue only a part of the heater plate 3, but is coupled with the entirety thereof. Thus, the life of the heater plate 3 can be prolonged.

The heater plate 3 is joined to the body 50 of the support 5. The heater plate 3 is adhered to the body 50 by adhesive, in this embodiment. However, another well known fixing means like rivets are available. The heater plate 3 is connected to the body 50 in a curved state so that, when assembled, the heater plate 3 is two-dimensionally contacted with the rear surface of the mirror 4. Splash preventing material (not shown) is provided on the rear surface of the mirror 4. The material has an outer surface of small frictional resitance and is made as a thin layer. In this embodiment, preferably, the flexible substrate 30 has its four corners applied with adhesive to join the heater plate 3 to the body 50. Thus, the heater plate 3 is three-dimensionally curved and has a part or a center thereof touched two-dimensionally with the splash preventing material. Thus, the heater plate 3 can efficiently transmit heat energy to the mirror 4. It is preferable to select a material that has high abrasion resistance as well as a low friction coefficient in order to form the flexible substrate 30, particularly to form the side which faces the mirror 4.

Next, an assembling work for the above structure will be described.

First, the heater plate 3 is joined to the inside of the body 50 of the support 5 while being curved. Then, the flexible printed cable 31 is introduced into the slot of the insertion block 54. Thereafter, the slot is shut off by a sealant while keeping the cable 31 in a relaxed state between the support 5 and the heater plate 3. On the other hand, the opposite end surfaces of the vibrator 2 are covered with the electrode bases 71 and 72 of the power supply device. Then, the vibrator 2 is joined to the fitting area 52 via the regulating projections 53 so that the base 72 faces the fitting area 52. Further, the flange 51 is adhered to the rear surface of the mirror 4. In this state, the mirror 4 and the support 5 are fitted to the holder 1. Then, the ends of the flexible printed cable 31 as well as of the circuit base 73 and the conductive layer 63 are drawn out of an outlet 19. Thereafter, the adhesive for the mirror 4, the support 5 or the like is cured to fix them immovably to the holder 1. At this time, the circuit base 73 is held near the center between the electrode base 71 and the end connections 64 by hooks 15 of the holder 1.

Next, the end connections 64 are connected with the lead wires 81 via the connection holes 65 and the auxiliary piece 76. More in detail, cores of the lead wires 81 are inserted into the connection holes 65 and apertures formed on the auxiliary piece 76. Then, the end connections 64 are soldered to join the lead wires 81 to the auxiliary member 76. Thereafter, the auxiliary member 76 is held between engaging lugs 16a and 16b and mounts 16c and 16d of a connector 16, which is formed integrally with the holder 1, thus being fixed to the holder 1. Next, the lead wires 81 are inserted into wire supports 16e so as to be fitted to the holder 1.

The heater plate 3 is secured to a connector 17 of a holder 1 in the same manner as above, and joined to the lead wires 82 via the connector 17. Namely, cores of the lead wires 82 are inserted into the connection holes 35 and apertures formed on the auxiliary piece 36. Then, the end connections 34 are soldered to join the lead wires 82 to the auxiliary member 36. Thereafter, the auxiliary member 36 is held between engaging lugs 17a and 17b and mounts 17c and 17d of the connector 17, which is formed integrally with the holder 1, thus being fixed to the holder 1. Next, the lead wires 82 are inserted into wire supports 17e so as to be fitted to the holder 1.

The rear view mirror of the present embodiment can be used as follows.

First, the vibrator 2 is supplied with power from the electrodes 61 and 62 via the lead wires 81 and the connector 16. Then, the piezoelectric element 23 of the vibrator 2 is contracted and expanded repeatedly so as to generate vibration. The vibration is then transmitted to the support 5 and passed further to the mirror 4 via the flange 51 and the adhesive. The vibration is supplied to the mirror 4 from the circumference and extending over the entirety of the mirror 4. Accordingly, if the frequency of the supplied power is selected at a proper value, the support 5 makes resonance and produces standing waves that are uniform as a whole and that have a large amplitude. Thus, the mirror 4 makes rapid movements by the standing waves. Thereby, a large amount of kinetic energy is applied to adherents on the mirror 4 such as water drops, frosted moistures, or dirt, so that they fall by gravity or are vaporized so as to be removed from the mirror 4.

The ultrasonic vibration also generates relative oscillation between the electrode 61, 62 joined thereto and the electrode base 71, 72 covering them. Further, relative vibration is produced between the electrodes 21 and 22 of the vibrator 2. This relative vibration is transmitted to the curved connection base 74 and the conductive layer 63 thereon. However, the connection base 74 and the conductive layer 63 are flexible and disposed in a relaxed state. In addition, the elastic strength of the base 74 and the layer 63 is not discontinuous. Therefore, they have their entirety distorted, thereby coping with displacements due to the ultrasonic vibration. As a result, stress is not accumulated at fixed locations of the power supply device and the conductive layers 63 are not fatigued and broken.

Relative ultrasonic vibration is generated between the circuit base 73 and the hook 15 and connector 16, since the base 73 is supported by the hook 15 while the connection hole 65 is fixed to the connector 16 via the auxiliary piece 76. Still, in the same manner as above, the base 73 and the conductive layer 63 are uniformly distorted as a whole, thereby dealing with displacement due to the relative vibration. Thus, breakage of the circuit can be avoided.

On the other hand, the ultrasonic vibration, transmitted through the support 5, is passed to and oscillates the flexible printed cable 31 near the insertion block 54. Also in this case, the cable 31 is evenly deformed as a whole to cope with the vibration. This is because the cable 31 is relaxedly disposed in the support 5, is flexible and possesses continuous elasticity strength. As a result, stress is not accumulated in particular areas of the cable 31. Thus, the cable 31 is free from breakage due to fatigue.

The heater plate 3 directly conducts heat to the mirror 4 as well as transfers heat by radiation and convection when power is supplied to the resistor pattern 32. Here, since the heater plate 3 has its center contacted with the mirror 4, the mirror 4 is usually warmed first at its center and has adherents thereon removed.

The mirror 4 is joined rigidly to the support 5 and is prevented from distortion while having its joint strength reinforced. Thus, the ultrasonic vibration can be effectively transmitted from the support 5 to the mirror 4.

The flexible printed cable 63 and 73 is fitted to the connector 16, so that the oscillation by the vibrator 2 can be efficiently transferred to the mirror 5 without any disturbance by the cable 63 and 73.

The ultrasonic vibration is passed to the holder 1 in a very small amount, if any, since the holder 1 supports the mirror 4 and the support 5 that are joined together. Moreover, the vibration is very small on a line from the vibrator 2 to the connector 16 via the cable 63 and 73. Thereby, the connector 16 for electrical connection is not affected by the ultrasonic oscillation. Thus, there arise no troubles such as imperfect contacts or disconnections around the connector 16.

The heater plate 3 does not regulate the ultrasonic vibration transferred to the mirror 4 by the same reason as the support 5.

The connector 17 for electrical connection does not suffer from the ultrasonic vibration as in the case of the connector 16. Thus, the connector 17 is free from troubles like imperfect contacts or disconnections thereabout.

The heating or temperature rise can be conducted effectively in the limited space defined between the mirror 4 and the body 50 which are spaced apart by the distance L. Moreover, the heater plate 3 is made of a flexible substrate 30, that is attached to the support 5 in a curved state, and the resistor 32 printed thereon. One advantage thereby is that the contact between the heater plate 3 and the mirror 4 does not hinder the transmission of the ultrasonic vibration to the mirror 4. Another advantage is that it is possible to lessen consumption of ultrasonic vibration energy at the heater plate 3.

With the vehicle mirror in this embodiment, the mirror 4 can have the temperature increased and water drops or the like, which tend to adversely influence the view through the mirror, removed from its central surface. Moreover, the heater plate 3 is, for the most part, separated from the support 5, to thereby reduce heat loss.

The vehicle mirror makes the space between the body 50 and the mirror 4 have a small and uniform in thickness. This means that, a relatively large space is defined at the side of the support 5 away from the mirror 4 or opposite to the above space. It is easy to accommodate parts for the circuit or other functional parts in the large space. In addition, a finished vehicle mirror can be compact.

Through the flexible printed cable 31 penetrates through the support 5, a clearance therebetween is firmly sealed. Thus, the cable 31 is prevented from being detached from the support 5. Moreover, if a relative vibration is generated between the heater plate 3 and the support 5, the cable 31 can absorb it. Therefore, there is little possibility that a particular part of the cable 31 will be fatigued and broken, thereby assuring a resultant long life thereto.

The vehicle mirror accommodates on its fixed positions the flexible printed cable 63 and 73 as well as the flexible printed cable 31. Thus, the assembling work for the cables 63 and 73 and 31 is easy.

For the cables 63 and 73 and 31, any materials having sufficient elasticity can be selected so that the cables 63 and 73 and 31 are arranged in a relaxed manner within the holder 1, to thereby prevent the transmission and energy consumption of the ultrasonic vibration. For example, the flexible printed cables may be flexible cables.

The connectors 16 and 17 may be omitted from the holder 1 in order to connect the cables 63 and 73 and 31 with the lead wires 81 and 82. In place thereof, a separate connector may be attached to the holder 1, or another type of connector may be formed on the holder 1. Anyway, it is enough for the connector of the holder 1 to have such a structure as can connect electrically the flexible cable with other conductors.

The ultrasonic vibrator 2 is repeatedly contracted and expanded in the longitudinal direction by the transversal effect of the piezoelectric effect, thereby heightening the efficiency. However, it is possible to utilize the longitudinal effect of the piezoelectric effect.

The electrodes 21 and 22 of the vibrator 2 are joined to the connector areas 61a and 62a of the supply electrodes 61 and 62 substantially on their entire surfaces. Thereby, contrary to the case of brazing, stress is not accumulated at a particular portion of the electrodes 21, 22, 61, and 62, thus extending their lives.

As described above in detail, in this embodiment, if ultrasonic vibration energy is applied to the power supply device, stress damages to a particular portion of the device are prevented, thereby assuring a stable power supply to the vibrator 2. Moreover, the device can have a closed structure, since the circuit layer 6 is hard to break.

In the use preferably in rear view mirrors for cars, the device reliably supplies power to the vibrator 2 for a long period of time, whereever the flexible base 7 and the circuit layer 6 are disposed in the holder 1. Moreover, the mirrors can be hermetically structured because of the rare breakage of the circuit layer 6.

Figure 10:
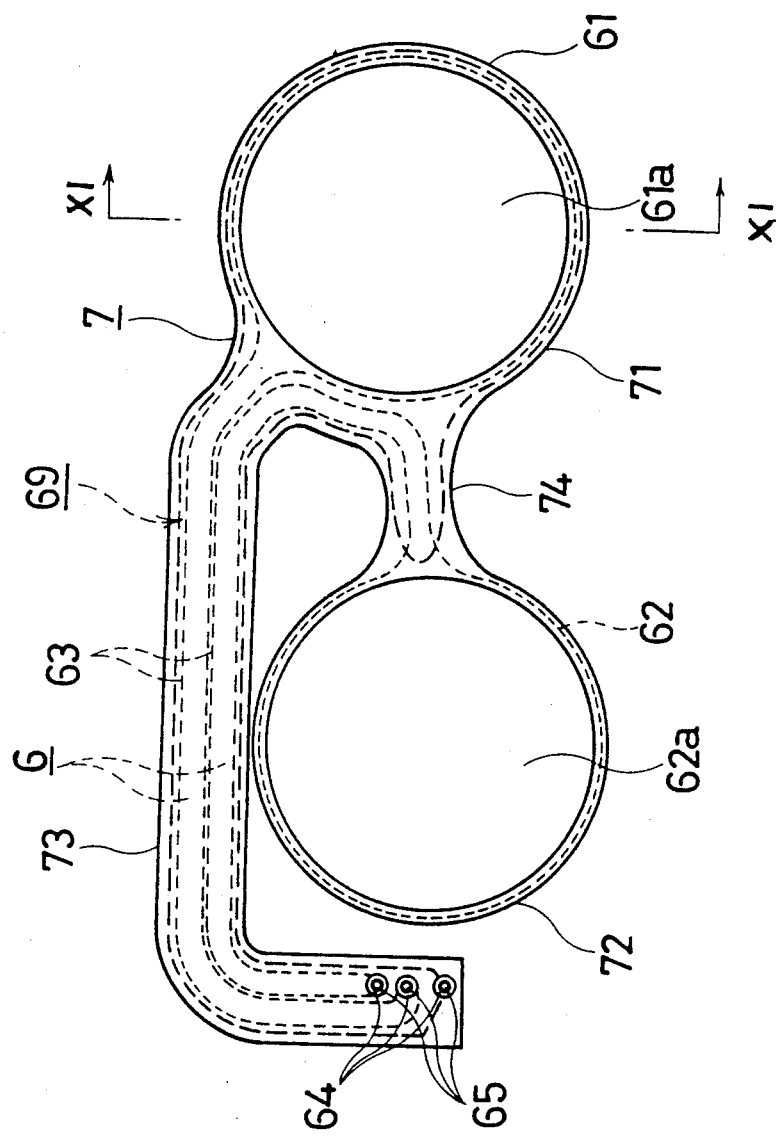
FIG. 10 is a developed view of a modified power supply device.
Figure 11:
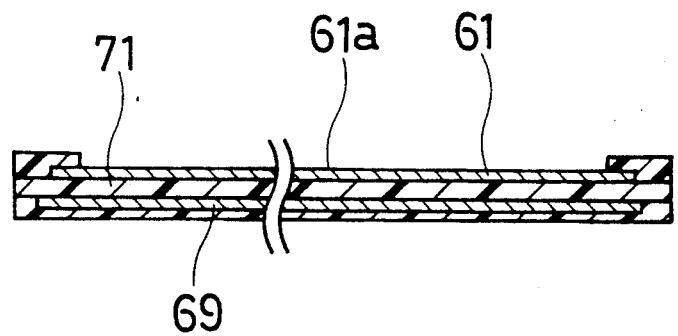
FIG. 11 is an enlarged cross sectional view taken along the line XI—XI of FIG. 10.
Figure 14:
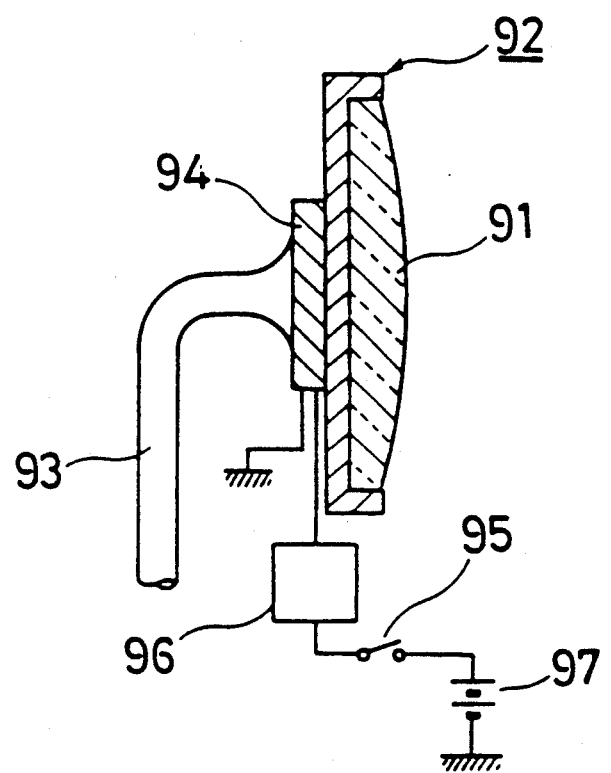
FIG. 14 is a cross sectional view of a conventional vehicle mirror.
Figure 15:
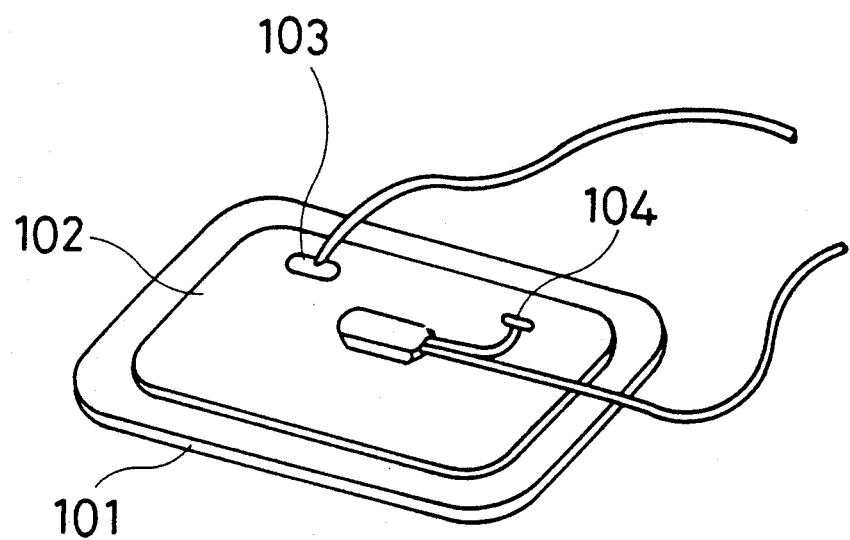
FIG. 15 is a perspective view of another conventional vehicle mirror.

In the power supply device of the above embodiment, the circuit layer 6 is formed on the flexible base 7. However, no consideration is given to inductive interference caused by the supplied high frequency power to generate the ultrasonic vibration. FIGS. 10 and 11 show a modified power supply device that has a countermeasure against the inductive interference.

In this modification, only the differences from the above embodiment will be explained.

As shown in the figures, a shield layer 69 as a shield pattern is made of conductive material and is formed on a back surface of the flexible base 7. The back surface means here a surface, opposite to the surface on which the circuit pattern 6 is provided, of the flexible base 7. The shield layer 69 is arranged over most of the part of the electrode base 71, the circuit base 73 and the connection base 74. An insulating film is disposed on the outer surface of the shield layer 69. The shield layer 69 has its width gradually reduced so that no discontinuity occurs in the resiliency of the connection base 74. Moreover, no shield layer is provided on the base 72 that faces the support 5 when assembled in the holder 1. Thus, the vibrator 2 can efficiently transmit oscillation to the support 5. Still, influence by the inductive interference is very small and can be disregarded owing to the shielding effect of a metal layer of the mirror 4.

The shield layer 69 is able to screen electromagnetic radiation, that will affect another other parts, from the electrode base 71, the circuit base 73 and the connection base 74. Therefore, noise or interference due to induction can be eliminated by the use of the power supply device of the present modification.

In addition, a shield layer 69, when made of properly selected material, can screen electrostatic or magnetic induction. Moreover, it is possible to cover and shield also the electrode base 72 by a shield layer In this case, the shielding efficiency is more improved.

The shield layer 69 is not necessarily formed on the back surface of the flexible base 7. For example, an insulating film may be arranged on the outer or upper surface of the circuit layer 6 and a shield layer be disposed thereon. That is, a shield layer can be provided on the circuit layer 6 by use of a well-known technique for forming a multilayer substrate. Further, the shield layer 69 may be multi-layered.

The support 5 has a structure to fix the heater 3 in the above embodiment. However, the present invention can be utilized in a device which has no heater 3 and uses only the ultrasonic vibrator 2. In this case, the support 5 may have another shape or structure accordingly.

FIGS. 12 and 13 illustrate a power supply device of another modification. The power supply device of this modification includes a circuit layer 6 and a flexible base 7.

Each of two conductive portions 61 and 62 is made into substantially the same shape as each opposite end surface of the ultrasonic vibrator 2 so as to be joined to the electrode 21, 22 at each opposite end thereof. A circuit portion 63a is electrically connected with the conductive portion 61 while a circuit portion 63b is electrically connected with the conductive portion 62. The circuit portions 63a and 63b are formed to extend from the conductive portions 61 and 62 to an end connection 64, respectively. The end connection 64 is located at a position spaced apart a predetermined distance from the conductive portion 61, 62.

The conductive portions 61 and 62 and the circuit portions 63a and 63b constitute the circuit layer 6.

Each of two electrode forming portions 71 and 72 has a shape larger than that of the conductive portion 61, 62. A flexible portion 74 is formed continuously and integrally between the two electrode forming portions 71 and 72. The flexible portion 74 connects the electrode forming portions 71 and 72 while being in a curved state, when the two conductive portions 61 and 62 are joined to the end surfaces of the ultrasonic vibrator 2. The above circuit portion 63 is formed on a circuit forming portion 73.

The electrode forming portions 71 and 72, the circuit forming portion 63, and the flexible portion 74 constitute the flexible base 7.

In a vehicle outside rear view mirror provided with the above mentioned device, the piezoelectric element 23 of the vibrator 2 is strained to generate relative vibration on the conductive portions 61 and 62 and the electrode forming portions 71 and 72. The relative vibration is applied to the flexible portion 74 and the circuit portion 63b thereon, which are curved in substantially a U shape. Still, the flexible portion 74 and the circuit portion 63 are curved in a relaxed state and have great flexibility. In addition, flexibility strength is not discontinuous with respect to the flexible portion 74 and the circuit portion 63. Thereby, the flexible portion 74 and the circuit portion 63 are deformed uniformly and able to cope with displacements due to the ultrasonic vibration. Subsequently, stress accumulation on a particular location of the device is prevented, thereby prolonging the time when the circuit portion 63 is broken due to fatigue. As a result, there is no fear of breakage of the circuit in normal uses.

Relative vibration is also applied between the circuit forming portion 73 and the hook 15 and the connector 16 of the holder 1, since the circuit forming portion 73 is held by the hook 15 while connection holes 65a and 65b of the end connection 64 are fixed to the connector 16. In this case, the circuit forming portion 73 and the circuit portion 63 are distorted uniformly, too, thereby preventing the breakage of the circuit in the same manner as above.

Connector areas 61a and 62a of the conductive portions 61 and 62 are connected mechanically with the electrodes 21 and 22 at substantially their entire surfaces so as to make one body. Thereby, stress is not accumulated only on a part of the connected body, contrary to the case of the brazing, thus extending its life.

Owing to the above, stress is not accumulated on a particular location of the power supply device in case ultrasonic vibration energy is applied to the device, so that power is supplied stably to the vibrator 2.

In particular, if the power supply device is used in a vehicle rear view mirror, power can be reliably supplied to the vibrator 2 whereever the flexible base 7 and the circuit layer 6 is disposed on the holder 1. In addition, the mirror can have a closed structure, since the circuit layer 6 is hard to break.

While the embodiments of the present invention, as herein disclosed, constitute a preferred form, it is to be understood that other forms might be adopted.

What is claimed is:

1. A power supply arrangement adapted to supply power from a power source to a pair of electrodes formed on opposite end surfaces of an ultrasonic vibrator, comprising:

(a) a circuit having two longitudinal ends and including;

a pair of supply electrodes defining one of the longitudinal ends of the circuit, each of said supply electrodes having a first surface of substantially the same shape as one end surface of the ultrasonic vibrator, the first surface of each of the supply electrodes being adapted to be positioned on one of the electrodes formed on one of the end surfaces of the ultrasonic vibrator, a pair of end connections defining the other longitudinal end of the circuit, and a pair of conductive layers, each of the conductive layers electrically connecting one of the supply electrodes and one of the end connections; and (b) a flexible base including;

an electrode base covering a second surface of each of the pair of supply electrodes, and a base section for holding the conductive layers.

2. A power supply arrangement according to claim 1, in which the electrode base includes a pair of bases, each base covering the second surface of one of the supply electrodes, and the flexible base further has a connection base formed integrally and continuously between the bases so that the connection base is bent when the pair of supply electrodes are connected to the ultrasonic vibrator.

3. A power supply arrangement according to claim 1, further comprising a shield layer provided on the flexible base so as to prevent inductive interference due to the circuit.

4. A power supply arrangement according to claim 3, in which the shield layer is placed at an outer position with respect to the circuit in relation to the ultrasonic vibrator.

5. A power supply arrangement according to claim 1; in which the base section has a first insulating film covering first parts of the conductive layers, a second insulating film covering a second part of one of the conductive layers, and a third insulating film covering a second part of the other conductive layer; and the electrode base has a first base connected to the second insulating film and a second base connected to the third insulating film, the first base covering the second surface of one of the supply electrodes, the second base covering the second surface of the other supply electrode;

whereby the third insulating film and part of the other conductive layer are bent when the supply electrodes are connected to the ultrasonic vibrator.

6. A vehicle mirror comprising:
(A) a mirror having a convex curved surface;
(B) a support arranged at a rear surface of the mirror and having a connecting circumference of curved shape so as to be in two-dimensional contact with the rear surface of the mirror;
(C) an ultrasonic vibrator connected to the support;
(D) a power supply arrangement adapted to supply power from a power source to the ultrasonic vibrator, comprising:
  (a) a circuit having two longitudinal ends and including;
  a pair of supply electrodes defining one of the longitudinal ends of the circuit, each of said supply electrodes having a first surface of substantially the same shape as one end surface of the ultrasonic vibrator, the first surface of each of the supply electrodes being adapted to be positioned on one of the electrodes formed on one of the end surfaces of the ultrasonic vibrator,
  a pair of end connections defining the other longitudinal end of the circuit, and
  a pair of conductive layers, each of the conductive layers electrically connecting one of the electrodes and one of the end connections; and
  (b) a flexible base including;
  an electrode base covering a second surface of each of the pair of supply electrodes, and
  a base section for holding the conductive layer; and (E) a holder joining the mirror and the support and having a connector providing electrical connection to the power supply arrangement.

7. A vehicle mirror according to claim 6, further comprising:
a flexible heater plate attached to the support in a space surrounded by the mirror and the support, the flexible heater plate having a contact surface in contact with the mirror to heat the mirror; and
a flexible cable for supplying power to the flexible heater plate;
the holder further having a second connector to provide electrical connection to the flexible cable.

8. A vehicle mirror according to claim 7, in which the flexible heater plate comprises a flexible substrate having a circumference and a central area, the circumference of the flexible substrate being joined to the support and the central area of the flexible substrate being curved to define the contact surface.

9. A vehicle mirror according to claim 7, the flexible cable is a flexible printed circuit disposed in a relaxed state between the support and the flexible heater plate while being sealed up from an outside of the support.

10. A vehicle mirror according to claim 6, in which the support has a fitting area that is of the same shape as a surface of the ultrasonic vibrator that is to be connected to the support.

11. A vehicle mirror according to claim 10, in which the support further has a regulating projection arranged around the fitting area so as to position the ultrasonic vibrator.

12. A vehicle mirror according to claim 6, in which the support is made of a material having substantially the same coefficient of thermal expansion as the mirror.

13. A vehicle mirror according to claim 6, in which the support further includes a body having substantially the same curvature as a curvature of the mirror and being disposed on the mirror with substantially a fixed space therebetween.

14. A vehicle mirror according to claim 13, in which a corner of the body of the support has a curvature larger than a curvature of a corresponding corner of the mirror.

15. A vehicle mirror according to claim 13, in which the support further has a vent provided on the body and a fiber sheet arranged on the vent.

* * * * *